(12) United States Patent
Dajaku

(10) Patent No.: US 12,166,378 B2
(45) Date of Patent: Dec. 10, 2024

(54) STATOR, ROTOR AND ELECTRIC MACHINE

(71) Applicant: FEAAM GmbH, Neubiberg (DE)

(72) Inventor: Gurakuq Dajaku, Neubiberg (DE)

(73) Assignee: FEAAM GmbH, Neubiberg (DE)

( * ) Notice: Subject to any disclaimer, the term of this patent is extended or adjusted under 35 U.S.C. 154(b) by 370 days.

(21) Appl. No.: 17/843,862

(22) Filed: Jun. 17, 2022

(65) Prior Publication Data

US 2022/0416593 A1 Dec. 29, 2022

(30) Foreign Application Priority Data

Jun. 25, 2021 (DE) .......................... 102021116518.0

(51) Int. Cl.
*H02K 1/14* (2006.01)
*H02K 1/16* (2006.01)
*H02K 1/2795* (2022.01)
*H02K 21/24* (2006.01)

(52) U.S. Cl.
CPC ........... *H02K 1/146* (2013.01); *H02K 1/2795* (2022.01); *H02K 21/24* (2013.01); *H02K 1/148* (2013.01); *H02K 1/16* (2013.01)

(58) Field of Classification Search
CPC ........... H02K 1/16; H02K 1/146; H02K 1/148
See application file for complete search history.

(56) References Cited

U.S. PATENT DOCUMENTS

| 5,519,270 | A | 5/1996 | Yamada et al. | |
| 7,030,529 | B2 | 4/2006 | Dommsch et al. | |
| 2002/0171315 | A1 | 11/2002 | Kastinger | |
| 2018/0013336 | A1* | 1/2018 | Li | F04C 29/0085 |
| 2019/0165630 | A1* | 5/2019 | Dajaku | H02K 19/12 |
| 2019/0372408 | A1* | 12/2019 | Taniguchi | H02K 1/279 |
| 2020/0161939 | A1* | 5/2020 | Takahashi | H02K 17/16 |

FOREIGN PATENT DOCUMENTS

DE 10215251 A1 10/2003

* cited by examiner

*Primary Examiner* — Gary A Nash
(74) *Attorney, Agent, or Firm* — Morgan, Lewis & Bockius LLP

(57) ABSTRACT

A stator for an electric machine is provided, the stator comprising at least three first plates at a first side of the stator, at least three teeth, each tooth being mechanically connected to a respective one of the first plates, and at least one second plate at a second side of the stator facing away from the first side, wherein the stator has, at least in some places, the shape of a ring having an outer side and an inner side, an electrical conductor is assigned to each tooth, and for each tooth, the respective electrical conductor is arranged at least at one side of the tooth which points towards the outer side of the stator and at one side of the tooth which points towards the inner side of the stator. Further, a rotor for an electric machine and an electric machine are provided.

16 Claims, 11 Drawing Sheets

STATOR, ROTOR AND ELECTRIC MACHINE

A stator for an electric machine, a rotor for an electric machine, and an electric machine are provided.

Typically, electric machines include a stator and a rotor movable relative thereto. Electric machines can work as a motor or as a generator, converting electrical energy into kinetic energy or vice versa. In operation, a magnetic field of the rotor interacts with a magnetic field of the stator. The stator typically has a stator winding and an iron core. By way of example, the stator winding may be formed by distributed overlapping windings or by tooth-concentrated windings.

In conventional electric machines or the stators of such machines, the ends of the windings usually project beyond the iron core of the stator, so that they are outside the axial length of the stator and cannot contribute to the torque. Therefore, in such electric machines, only the axial length of the iron core of the stator contributes to the generation of electromagnetic torque. This length is therefore usually referred to as the active length of the electric machine.

The currents flowing through the windings generate unnecessary ohmic losses in the end region. Furthermore, especially for applications with limited space in the axial direction, the lengths of the winding ends can become relatively large in relation to the total length of the windings or the active length of the electric machine.

One problem to be solved is to provide a stator for an electric machine that can be operated efficiently. Another problem to be solved is to provide a rotor for an electric machine that can be operated efficiently. Another problem to be solved is to provide an electric machine that can be operated efficiently.

The solution is provided by the subject-matter of the independent patent claims. Advantageous designs and further developments are specified in the subclaims.

According to at least one embodiment of the stator for an electric machine, the stator comprises at least three first plates at a first side of the stator. The first plates may each have the same shape. At least in some places, the first plates have the shape of a panel. This means that the first plates have, at least in some places, a top side and a bottom side which extend parallel to each other. In a direction which extends perpendicular to the main extension plane of the top side, the first plates each have a smaller extension than within that plane in which the top side is located. That is, the thickness of the first plates is in each case less than their extension in their main extension plane. The first plates may each comprise steel or magnetic steel. Further, it is possible that the first plates each comprise soft magnetic powder composites. The stator may comprise at least four first plates or at least six first plates.

The stator further comprises at least three teeth, each tooth being mechanically connected to a respective one of the first plates. This means that each tooth is attached to a respective first plate. Each first plate may be mechanically connected to exactly one tooth. Each tooth may be in direct contact with a respective one of the first plates. The first plates each have a side which is arranged at the first side of the stator. The teeth are each arranged at that side of the first plates which faces away from the first side of the stator. In a cross-section through the stator, each tooth has a smaller area than the first plates. That is, in a cross-section through the stator, each tooth has a smaller area than the first plate to which that tooth is connected. The cross-section through the stator lies in a plane which extends parallel to that plane in which the top sides of the first plates extend. The teeth are spaced apart from each other in each case. The teeth are arranged side by side along the circumference of the stator. The teeth may each comprise steel or magnetic steel. Further, it is possible that the teeth each comprise soft magnetic powder composites. The stator may have at least four teeth or at least six teeth.

The stator further comprises at least one second plate at a second side of the stator facing away from the first side. The second side of the stator is on the opposite side compared to the first side of the stator. The second plate has, at least in some places, the shape of a panel. That is, the second plate has, at least in some places, a top side and a bottom side which extend parallel to each other. In a direction which extends perpendicular to the main extension plane of the top side, the second plate has a smaller extension than within that plane in which the top side is located. That is, the thickness of the second plate is in each case less than its extension in its main extension plane. The second plate may have the shape of a ring segment or an arc of a circle. This means that the second plate may extend along a portion of the circumference of the stator. It is further possible that the second plate has the shape of a ring. In this case, the second plate extends along the entire circumference of the stator. The second plate may be a stator yoke. The second plate may comprise steel or magnetic steel. Further, it is possible that the second plate comprises soft magnetic powder composites. The second plate may have a shape differing from that of the first plates. However, it is also possible that the second plate has the same or a similar shape as the first plates.

At least in some places, the stator has the shape of a ring having an outer side and an inner side. This may mean that the stator, at least in some places, has the shape of a hollow cylinder. Here, the outer side is the side which is at the outside of the hollow cylinder and the inner side is the side which faces the interior of the hollow cylinder. Likewise, with the shape of a ring, the outer side is the side which is at the outside of the ring and the inner side is the side which faces the area inside the ring. The area inside the ring is the area that is enclosed by the ring. The fact that the stator has the shape of a ring at least in some places may mean that the stator has an extension in a vertical direction which is smaller than the radius of the ring. In this context, the vertical direction is perpendicular to the plane in which the circle is located which is enclosed by the ring. In vertical direction, the extension of the stator may be smaller than the radius of the ring by a factor of 2. It is further possible that the extension of the stator in the vertical direction is smaller than the radius of the ring by a factor of 3.

An electrical conductor is assigned to each tooth. This means that the stator comprises an electrical conductor for each tooth. Each electrical conductor comprises an electrically conductive material, for example copper or aluminum. The electrical conductors each may be a wire or a coil. The coil may have any number of turns in each case.

For each tooth, the respective electrical conductor is arranged at least at a side of the tooth pointing towards the outer side of the stator, and at a side of the tooth pointing towards the inner side of the stator. At least in some places, the teeth are respectively not connected to a first plate or to the second plate at their sides pointing towards the inner side of the stator and at their sides pointing towards the outer side of the stator. For each tooth, the side of the respective tooth pointing towards the outer side of the stator is the side which faces the outer side of the stator. Likewise, for each tooth, the side of the respective tooth pointing towards the inner side of the stator is the side which faces the inner side of the stator. Thus, for each tooth, the respective electrical conductor is arranged at at least two different sides of the tooth. On the whole, for each tooth, the respective electrical conductor may be wrapped around the tooth. This may mean that for each tooth the respective electrical conductor surrounds the tooth in a plane from all sides. This plane extends parallel to that plane in which the circle surrounded by the annular stator is arranged. If the electrical conductors each represent a coil, the turns of the coil may be wound around the respective tooth. Thus, the electrical conductors each extend in some places along a portion of the circumference of the annular stator and in some places in radial directions with respect to the circle surrounded by the annular stator.

The electrical conductors are electrically insulated with respect to the first plates and the teeth. For this purpose, the electrical conductors can each be completely surrounded by an electrically insulating material. In addition, the electrical conductors are electrically insulated with respect to the second plate.

The stator described herein is based on the idea that it can have a particularly compact design and, in particular, a small extension in the vertical direction. The electrical conductors which form a stator winding are arranged so as to be completely within the stator. This means that there are no heads which protrude beyond a base body of the stator. Instead, the electrical conductors are arranged entirely between the first plates and the second side of the stator where the second plate is located. The electrical conductors do not extend beyond the extension of the first plates and the second plate in the vertical direction. This is achieved by arranging the electrical conductors at the sides of the teeth described above.

The first plates and the second plate are spaced apart from each other so that openings towards the electrical conductors are formed in each case at the outer side of the stator and at the inner side of the stator. These openings can be used to generate a torque. Thus, a radial flux rotor can be arranged at the outer side of the stator or at the inner side of the stator or at both sides. In this way, an electric machine in which the stator is installed also has a smaller overall extension in the vertical direction.

This design of the stator has the advantage that the entire length of the stator in the vertical direction can be used for torque generation. Winding heads projecting beyond the active length are avoided in this design. This also avoids the losses that can occur with winding heads projecting beyond the active length. This means that an electric machine can be operated more efficiently with the stator on the whole.

A further advantage of the stator described here is that it has a total of three areas which can be used for torque generation. Thus, the stator has openings both at its inner side and at its outer side. If a rotor is arranged at these openings, a torque can be generated in each case. In addition, the first plates can be arranged at a distance from each other. This means that openings towards the electrical conductors are also arranged at the first side of the stator. Thus, a rotor for torque generation can also be arranged at the first side of the stator. Consequently, the electric machine may have a compact and flat design as a whole and the stator is used more efficiently for torque generation. Thus, the electric machine including the stator can advantageously be used in applications where only limited space is available. A compact design of the stator or the electric machine as a whole is advantageous in the field of robotics, for example. In addition, a reduction in costs can be achieved with a compact design. On the whole, the available space is efficiently utilized in an electric machine including the stator described herein.

The use of soft magnetic composites or magnetic steel has the advantage that these materials are inexpensive on the whole, enable a simple manufacture of the stator and exhibit advantageous isotropic ferromagnetic properties even in three dimensions.

According to at least one embodiment of the stator, the teeth and the first plates each extend along a portion of the circumference of the stator. That is, the teeth and the first plates each have the shape of a ring segment or arc. In a cross-section through the stator, the teeth and the first plates each have the shape of a ring segment or arc. The cross-section of the stator lies in a plane that extends perpendicular to the vertical direction. Thus, the teeth and the first plates each have a curved shape. The first plates may be arranged side by side along the circumference of the stator. The teeth may be arranged side by side along the circumference of the stator. The teeth may each have a smaller extension along the circumference of the stator than the first plate to which they are connected. Along the circumference of the stator, each first plate may project on two sides beyond the tooth to which it is connected. The first plates and the teeth are thus adapted to the annular shape of the stator. Thus, the stator may have a compact design as a whole.

For an angle $\alpha$ over which each first plate extends along the circumference of the stator, the following applies:

$$\alpha < \frac{2\pi}{q}$$

Here, $\alpha$ is defined in the circle which is surrounded by the stator, and q is the number of first plates of the stator.

According to at least one embodiment of the stator, the first plates each extend in some places along the outer side of the stator. For this purpose, the first plates can each have a projection starting from the first side of the stator, which projection is arranged at the outer side of the stator. The projection may extend along a portion of the circumference of the stator and from the first side of the stator towards the second side of the stator. Thus, the projection may also have the shape of a ring segment or circular arc.

According to at least one embodiment of the stator, the first plates each extend in some places along the inner side of the stator. For this purpose, the first plates may each have a projection starting from the first side of the stator, which projection is arranged at the inner side of the stator. The projection may extend along a portion of the circumference of the stator and from the first side of the stator towards the second side of the stator. Thus, the projection may also have the shape of a ring segment or circular arc.

According to at least one embodiment of the stator, the second plate extends in some places along the outer side of the stator. For this purpose, the second plate may have a projection starting from the second side of the stator, which projection is arranged at the outer side of the stator. The projection may extend along a portion of the circumference of the stator and from the second side of the stator towards the first side of the stator. Thus, the projection may also have the shape of a ring segment or circular arc.

According to at least one embodiment of the stator, the second plate extends in some places along the inner side of the stator. For this purpose, the second plate may have a projection starting from the second side of the stator, which projection is arranged at the inner side of the stator. The projection may extend along a portion of the circumference of the stator and from the second side of the stator towards the first side of the stator. Thus, the projection may also have the shape of a ring segment or arc.

The projections of the first plates and of the second plate may extend equally far at the outer side of the stator. The projections of the first plates and of the second plate may extend equally far at the inner side of the stator. As an alternative, the extension of the projections of the first plates at the outer side of the stator may differ from the extension of the projections of the second plate at the outer side of the stator. Further, the extension of the projections of the first plates at the inner side of the stator may differ from the extension of the projections of the second plate at the inner side of the stator.

At the outer side of the stator and at the inner side of the stator, the first plates are spaced apart from the second plate. Thus, there is an opening between the projections of the first plates and of the second plate at the outer side of the stator and at the inner side of the stator, respectively. Below each of the openings, there is an electrical conductor. This means that an electrical conductor is visible in each opening. In other words, it is possible that each opening is adjacent to one of the electrical conductors. Thus, the openings can be compared to groove openings. The arrangement of the projections at the outer side of the stator and at the inner side of the stator thus enables openings to be formed at these sides of the stator, via which a torque can be generated when a rotor is arranged so as to be adjacent to the openings.

According to at least one embodiment of the stator, the stator has at least two additional second plates at the second side, and each tooth is mechanically connected to the second plate or to one of the additional second plates. The additional second plates may each have the same design as the second plate. In this case, the second plate and the additional second plates may each have the shape of a ring segment or circular arc. That is, the second plate and the additional second plates extend along a portion of the circumference of the stator. Taken as the whole, each first plate is thus mechanically connected to the second plate or to an additional second plate via a tooth. The second plate and the additional second plates may each be spaced apart from one another. Thus, openings are also formed at the second side, below which electrical conductors are arranged. In this case, the individual components of the stator are held together by a housing. For each first plate, the latter may have the same shape as the second plate or the additional second plate to which the first plate is connected. This means that the first plates, the second plate and the additional second plates may each extend over the same distance along the circumference of the stator. However, it is also possible for the second plate and the additional second plates to extend further along the circumference of the stator than the first plates to which they are connected. By using a second plate and at least two additional second plates instead of an annular second plate, a leakage flux through the second plate is reduced. Thus, an electric machine including the stator can be efficiently operated.

According to at least one embodiment of the stator, the second plate extends further along the circumference of the stator than each of the first plates. In this regard, the second plate may have the shape of a ring and the first plates may each have the shape of a ring segment or circular arc. The first plates are spaced apart from each other along the circumference of the stator. Thus, openings are advantageously formed between the first plates at the first side of the stator which enable torque generation when an axial flux rotor is arranged at the first side of the stator.

According to at least one embodiment of the stator, the electrical conductors each form a coil. That is, each of the electrical conductors forms a coil. The coils may each have any number of turns. The coils each have at least one turn. The coils form a stator winding, so that the stator can be used in an electric machine.

According to at least one embodiment of the stator, the first plates are arranged to be spaced apart from the second plate at the outer side and at the inner side of the stator. Thus, at least one opening is formed at the outer side and at the inner side, respectively. The electrical conductors are arranged below the openings. This may mean that an electrical conductor is arranged adjacent to each opening. Thus, the openings are comparable to groove openings. These openings enable the stator with a rotor arranged adjacent to the openings to be used for torque generation. A rotor can thus be arranged at the inner side of the stator and/or at the outer side of the stator. Thereby, the extension of the electric machine in the vertical direction is not increased by attaching the rotor(s), but an overall compact design is made possible.

According to at least one embodiment of the stator, the first plates are each spaced apart from each other along the circumference of the stator. This means that an opening is arranged at the first side of the stator between each two first plates. The electrical conductors are arranged below these openings. This may mean that an electrical conductor is arranged adjacent to each opening. Thus, the openings are comparable to groove openings. These openings allow the stator to be used for torque generation with a rotor arranged adjacent to the openings. This means that a rotor can be arranged at the first side of the stator. Thus, the volume of the stator is efficiently used for torque generation.

According to at least one embodiment of the stator, the first plates and the second plate each have at least two recesses at the outer side and at the inner side of the stator. The recesses at the outer side extend towards the inner side. The recesses at the inner side extend towards the outer side. The recesses do not extend completely through the stator between the inner side and the outer side. In the vertical direction, the recesses may each extend completely through the first plates and the second plate. Thus, the stator can be used in a stepper motor. This enables high accuracy for small rotations.

A rotor for an electric machine is further provided. The rotor can preferably be used with a stator described herein in an electric machine.

According to at least one embodiment of the rotor for an electric machine, the rotor comprises an annular rotor yoke extending from a first side of the rotor to a second side of the rotor facing away from the first side. The second side of the rotor is located on the opposite side with respect to the first side of the rotor. The fact that the rotor yoke has the shape of a ring may mean that the rotor yoke has the shape of a hollow cylinder, at least in some places. The fat that the rotor yoke is annular can also mean that the rotor yoke has an extension in a vertical direction that is smaller than the radius of the rotor yoke. In this regard, the vertical direction extends perpendicular to the plane in which the circle is located which is enclosed by the rotor yoke. The extension of the rotor yoke in the vertical direction can be smaller than the radius of the rotor yoke by a factor of 2. It is further possible that the extension of the rotor yoke in the vertical direction is smaller than the radius of the rotor yoke by a factor of 3. The rotor yoke may comprise iron.

The annular rotor yoke has an outer side and an inner side. Here, the outer side is the side located at the outside of the hollow cylinder and the inner side is the side facing the interior of the hollow cylinder. Likewise, with the shape of a ring, the outer side is the side that is at the outside of the ring and the inner side is the side that faces the area inside the ring. The area inside the ring is the area that is enclosed by the ring.

The rotor further comprises at least two first rotor teeth which are disposed at the second side of the rotor, are mechanically connected to the rotor yoke and each extend along a portion of the circumference of the rotor. The first rotor teeth may be integrally formed with the rotor yoke. The first rotor teeth may comprise the same material as the rotor yoke. That is, the first rotor teeth may comprise iron. The first rotor teeth may each have the shape of a ring segment or circular arc. At the second side, the first rotor teeth may be flush with the rotor yoke. That is, at the second side, the first rotor teeth extend as far in the vertical direction as the rotor yoke. It is further possible that the rotor comprises at least four first rotor teeth.

The rotor further comprises at least two second rotor teeth. The second rotor teeth are disposed at the first side of the rotor. The second rotor teeth may be mechanically connected to the rotor yoke. At the first side of the rotor, the second rotor teeth may be flush with the rotor yoke. That is, at the first side of the rotor, the second rotor teeth extend as far in the vertical direction as the rotor yoke. It is further possible that the rotor comprises at least four second rotor teeth.

The second rotor teeth each extend along a portion of the circumference of the rotor. This means that the second rotor teeth may each have the shape of a ring segment or circular arc.

A first rotor tooth of the rotor may be assigned to each of the second rotor teeth. In each case, the second rotor tooth may extend as far as its associated first rotor tooth along the circumference of the rotor yoke. Along the circumference of the rotor yoke, each second rotor tooth can be flush with its respective associated first rotor tooth. This means that each second rotor tooth extends parallel to its associated first rotor tooth along the circumference of the rotor yoke. In this regard, it is also possible for a first rotor tooth to extend further along the circumference of the rotor yoke than the second rotor tooth assigned to it, or for a second rotor tooth to extend further along the circumference of the rotor yoke than the first rotor tooth assigned to it.

The second rotor teeth each have a permanent magnet or the second rotor teeth each have the same material as the first rotor teeth. The second rotor teeth may each be formed by one permanent magnet. If the second rotor teeth have the same material as the first rotor teeth, the second rotor teeth may each have the same design as the first rotor teeth. Furthermore, the second rotor teeth may also be integrally formed with the rotor yoke.

Advantageously, the rotor can be used in an electric machine having the stator described herein. In this case, magnetic flux may pass through the stator and the rotor along different paths. Thus, during operation of the electric machine, a magnetic flux is induced in radial and axial directions as well as in radial and axial directions and along the circumference of the stator. Due to the different paths of the magnetic flux, the electric machine can be operated efficiently.

According to at least one embodiment of the rotor, the first rotor teeth and the second rotor teeth are arranged at the inner side of the annular rotor yoke. In this case, the rotor can be used as an external rotor with the stator in the electric machine. This means that the rotor is arranged around the stator. This design allows the electric machine to have a compact and flat shape. At the same time, the electric machine can be operated efficiently.

According to at least one embodiment of the rotor, the first rotor teeth and the second rotor teeth are arranged at an outer side of the annular rotor yoke. In this case, the rotor can be used as an internal rotor with the stator in an electric machine. This means that the rotor is arranged inside the stator. This design allows the electric machine to have a compact and flat shape. At the same time, the electric machine can be operated efficiently.

According to at least one embodiment of the rotor, the magnetization direction of at least one of the permanent magnets extends towards the center of the annular rotor yoke and the magnetization direction of at least one other permanent magnet extends away from the center of the annular rotor yoke. For each permanent magnet, the magnetic axis runs parallel to the magnetization direction of the respective permanent magnet. This means that the magnetic axis connects the two poles of each permanent magnet. The center of the annular rotor yoke corresponds to the center of the circle surrounded by the rotor yoke. With these magnetization directions of the permanent magnets, an efficient operation of the electric machine is enabled.

According to at least one embodiment of the rotor, the first rotor teeth each comprise a permanent magnet. By way of example, the first rotor teeth are each formed by a permanent magnet. In this context, the magnetization direction of the permanent magnet of each first rotor tooth points in the opposite direction compared to the magnetization direction of the respective parallelly arranged permanent magnet of a second rotor tooth. As a result, in an electric machine in which the rotor is used, the magnetic flux is increased and thus a larger torque can be generated.

Furthermore, an electric machine is disclosed. According to at least one embodiment of the electric machine, the electric machine comprises the stator described herein. Thus, all features of the stator described are also disclosed for the electric machine and vice versa. The electric machine further comprises a rotor arranged at the outer side or at the inner side of the stator. The rotor can thus be an internal rotor or an external rotor. If the rotor is an internal rotor, an outer side of the rotor faces the stator. If the rotor is an external rotor, an inner side of the rotor faces the stator. The rotor can be arranged on a shaft of the electric machine. An air gap may be arranged between the stator and the rotor. The rotor may have permanent magnets. The electric machine may be a synchronous reluctance machine, a switched reluctance machine, an asynchronous machine, a linear motor, a stepper motor or another electric machine.

According to at least one embodiment of the electric machine, the electric machine comprises the stator described herein and two rotors. One of the rotors is arranged at the outer side of the stator and the other rotor is arranged at the inner side of the stator. The two rotors are radial flux rotors.

According to at least one embodiment of the electric machine, the electric machine comprises the stator described herein and three rotors. One of the rotors is arranged at the outer side of the stator, one of the rotors is arranged at the inner side of the stator and one of the rotors is arranged at the first side of the stator. The rotor disposed at the outer side of the stator and the rotor disposed at the inner side of the stator are radial flux rotors. The rotor arranged at the first side of the stator is an axial flux rotor.

As described above, an electric machine with a stator described herein can be efficiently operated. The stator has a total of three sides at which a rotor can be arranged for torque generation. Thus, the electric machine may have one, two or three rotors.

According to at least one embodiment of the electric machine, the rotor is the rotor described herein. Thus, all features of the rotor described herein are also disclosed for the electric machine and vice versa. When using a rotor described herein, the torque that can be generated can be further increased. The shape of the rotor is adapted to the shape of the stator. For example, the parallel arrangement of the first rotor teeth and the permanent magnets of the second rotor teeth allows a magnetic flux to flow in radial and axial directions through the stator and the rotor. In addition, the rotor's permanent magnets extending along the circumference of the rotor yoke allow a magnetic flux in the axial and radial directions and along the circumference of the stator. This means there are a total of two paths of magnetic flux in the electric machine. Thus, the volume of the stator and of the rotor are efficiently used for torque generation and the electric machine can be operated efficiently.

Furthermore, the rotor can have the same extension in the vertical direction as the stator. Thus, both the stator and the rotor enable the electric machine to have a compact and flat design. Advantageously, the electric machine can thus be used in applications in which the space for the electric machine is limited or a particularly flat shape of the electric machine is required.

According to at least one embodiment of the electric machine, the electric machine comprises a further rotor which is arranged at the outer side or at the inner side of the stator. This means that the electric machine has two rotors in total. The further rotor is a rotor described here. That is, the further rotor comprises an annular rotor yoke which extends from a first side of the further rotor to a second side of the further rotor facing away from the first side, at least two first rotor teeth which are arranged at the second side of the further rotor, mechanically connected to the rotor yoke and each extend along a portion of the circumference of the further rotor, and at least two second rotor teeth, the second rotor teeth being arranged at the first side of the further rotor, the second rotor teeth each extending along a portion of the circumference of the further rotor, and the second rotor teeth each comprising a permanent magnet or the second rotor teeth each comprising the same material as the first rotor teeth.

The rotor and the further rotor may each be a radial flux rotor. In this context, either the rotor is arranged at the outer side of the stator and the further rotor at the inner side of the stator, or the rotor is arranged at the inner side of the stator and the further rotor at the outer side of the stator. Thus, the extension of the electric machine in vertical direction is not increased by attaching the rotors. This means that, in general, a compact and flat design of the electric machine is made possible. Two paths of magnetic flux are made possible by both rotors in each case. With a larger number of paths of the magnetic flux, the torque that can be generated can be increased. Thus, the electric machine can be operated efficiently.

According to at least one embodiment of the electric machine, the electric machine comprises an axial flux rotor arranged at the first side of the stator. The diameter of the axial flux rotor may be equal to the diameter of the stator. Further, the diameter at the inner side of the axial flux rotor may be equal to the diameter at the inner side of the stator. As described above, an axial flux rotor at the first side of the stator can further increase the torque that can be generated. In this case, the axial flux rotor faces the openings between the first plates at the first side of the stator. Thus, the electric machine can be operated efficiently. It is further possible that the electric machine comprises the rotor, the further rotor and the axial flux rotor. Here, the three rotors may have either the same number of magnetic poles or a different number of magnetic poles. Further, the three rotors may be mounted on the same shaft or on two or three different shafts.

In the following, the stator, the rotor and the electric machine are explained in more detail in connection with exemplary embodiments and the associated Figures.

Figure 1A:
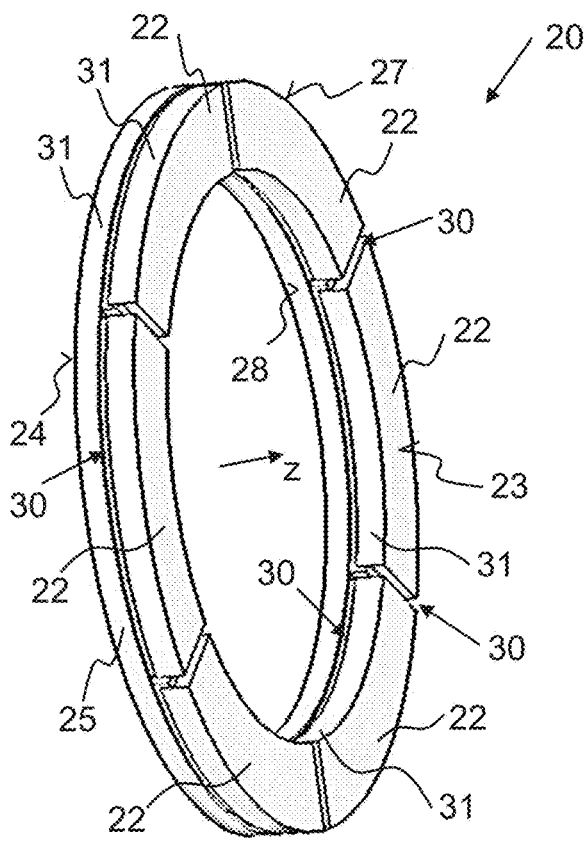
FIGS. 1A, 1B and 1C show an exemplary embodiment of the stator.
Figure 1B:
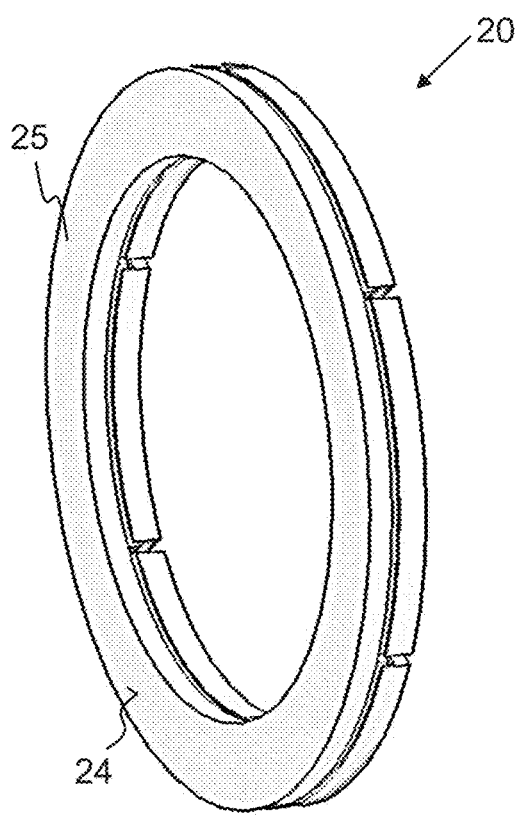
Figure 1C:
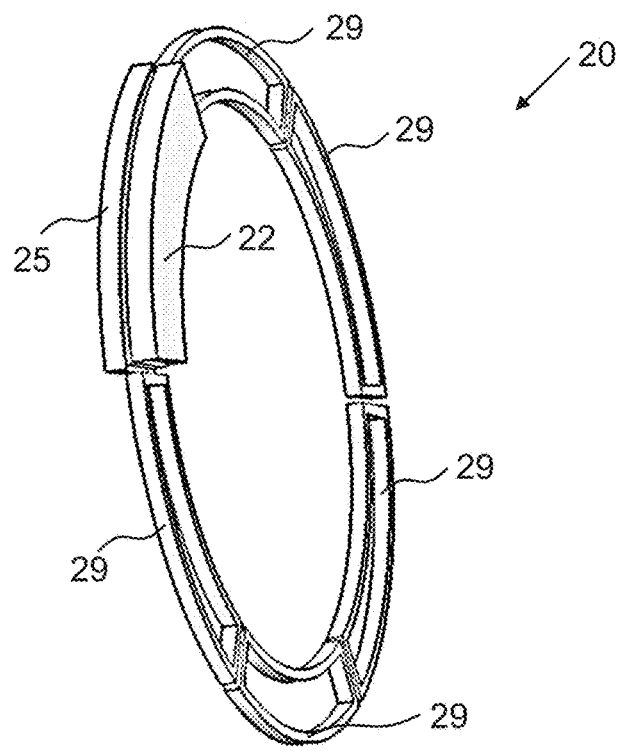

FIGS. 1A, 1B and 1C illustrate an exemplary embodiment of a stator 20 for an electric machine 21. Here, FIG. 1A shows the exemplary embodiment of the stator 20. The stator 20 comprises six first plates 22 at a first side 23 of the stator 20. The stator 20 generally has the shape of a ring. The first plates 22 are arranged so as to be distributed side by side along the circumference of the ring. The first plates 22 are each arranged so as to be spaced apart from each other along the circumference of the stator 20. That is, each of the first plates 22 extends along a portion of the circumference of the stator 20. Thus, each first plate 22 has the shape of a ring segment or arc. At the first side 23 of the stator 20, the first plates 22 each have a main extension plane. At the first side 23 of the stator 20, the first plates 22 extend the same distance along a vertical direction z. The vertical direction z is perpendicular to the main extension planes of the first plates 22 at the first side 23 of the stator 20. The first plates 22 all have the same shape and are arranged spaced apart from each other. Thus, an opening 30 remains between each pair of first plates 22.

The stator 20 further comprises six teeth 26, each tooth 26 being mechanically connected to a respective one of the first plates 22. In FIG. 1A, the teeth 26 are covered by the first plates 22 and are not visible.

The stator 20 further comprises a second plate 25 at a second side 24 of the stator 20 facing away from the first side 23. The second plate 25 has the shape of a ring. Thus, the second plate 25 extends further along the circumference of the stator 20 than each of the first plates 22. At the second side 24 of the stator 20, the second plate 25 has a main extension plane.

The stator 20 has an outer side 27 and an inner side 28. Here, the outer side 27 is the external side of the annular stator 20 and the inner side 28 is the side facing the center of the circle surrounded by the annular stator 20.

The stator 20 further has six electrical conductors 29, with one of the electrical conductors 29 being assigned to each tooth 26. In this connection, for each tooth 26, the respective electrical conductor 29 is arranged at least at a side of the tooth 26 pointing towards the outer side 27 of the stator 20 and at a side of the tooth 26 pointing towards the inner side 28 of the stator 20. In FIG. 1A, also the electrical conductors 29 are covered by the first plates 22 and are not visible.

The first plates 22 each have, starting from the first side 23 of the stator 20, a projection 31 at the outer side 27 of the stator 20 and a projection 31 at the inner side 28 of the stator 20. Similarly, starting from the second side 24 of the stator 20, the second plate 25 has a projection 31 at the outer side 27 of the stator 20 and a projection 31 at the inner side 28 of the stator 20. The projections 31 each extend along a portion of the circumference of the stator 20. This means that the projections 31 each have the shape of a ring segment or arc. At the outer side 27 and at the inner side 28, the projections 31 are arranged at a distance from each other. This means that the first plates 22 at the outer side 27 and the inner side 28 of the stator 20 are arranged so as to be spaced from the second plate 25. Thus, an opening 30 remains between the projections 31 of the first plates 22 and the second plate 25 at the outer side 27 and at the inner side 28, respectively. The electrical conductors 29 are adjacent to the openings 30 at the outer side 27, the inner side 28 and the first side 23, respectively.

In FIG. 1B, the exemplary embodiment of the stator 20 shown in FIG. 1A is shown from a different direction, namely from the second side 24. The annular second plate 25 is arranged at the second side 24.

In FIG. 1C, the six electrical conductors 29 from the exemplary embodiment of the stator 20 shown in FIG. 1A are illustrated. Also shown are a first plate 22 and a segment of the second plate 25. The electrical conductors 29 are each a conductor section, which is closed. For example, the electrical conductors 29 each form a coil. The individual turns of the coils are not shown here. The first plate 22 and the segment of the second plate 25 exemplarily show for one electrical conductor 29 how the latter is covered by the first plate 22 and the second plate 25. As a whole, the electrical conductors 29 are arranged side by side along the circumference of the stator 20. The electrical conductors 29 are arranged so as to be spaced apart from one another and are electrically insulated with respect to the first plates 22, the teeth 26, and the second plate 25.

Figure 2A:
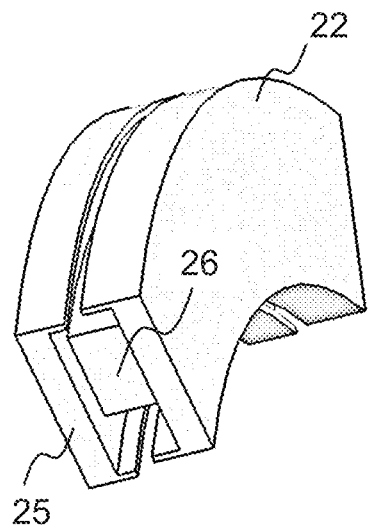
FIGS. 2A, 2B, 2C and 2D show sections of the exemplary embodiment of the stator.

FIGS. 2A, 2B, 2C and 2D show sections of the exemplary embodiment of the stator 20 of FIG. 1A. In FIG. 2A, a tooth 26 is shown between a first plate 22 and a section of the second plate 25. The tooth 26 extends along a portion of the circumference of the stator 20 below the first plate 22. The first plate 22 and the second plate 25 extend further along the circumference of the stator 20 than the tooth 26. The remaining teeth 26 of the stator 20 have the same design as shown in FIG. 2A.

Figure 2B:
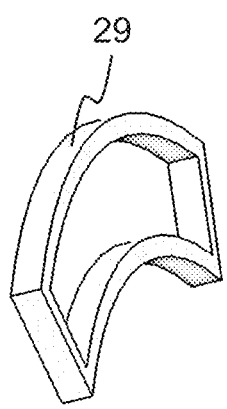

In FIG. 2B, the electrical conductor 29 assigned to the tooth 26 of FIG. 2A is shown separately. Here, the electrical conductor 29 has the design shown in FIG. 1C.

Figure 2C:
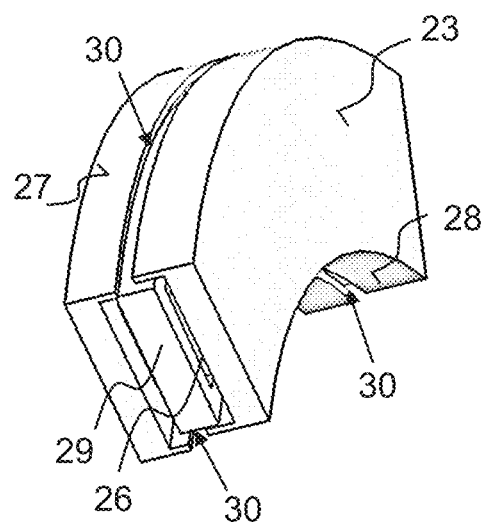

In FIG. 2C, the design shown in FIG. 2A is shown together with the electrical conductor 29. Here, the electrical conductor 29 is wound around the tooth 26. The electrical conductor 29 is visible in the openings 30 at the outer side 27, the inner side 28 and the first side 23.

Figure 2D:
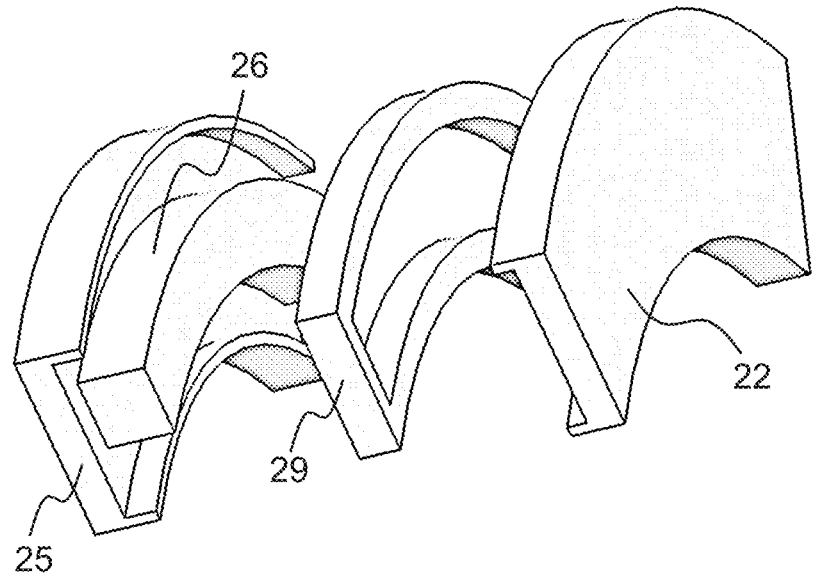

In FIG. 2D, the design shown in FIG. 2C is illustrated disassembled into individual components. On the far left, there is shown the section of the second plate 25 together with the tooth 26. The electrical conductor 29 is shown in the center and the first plate 22 is shown on the right.

Figure 3A:
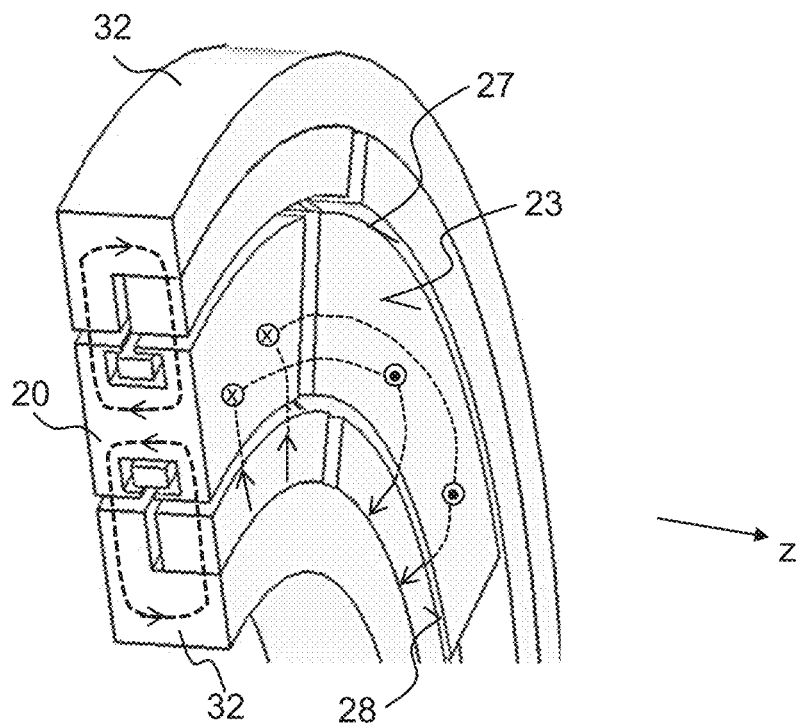
FIGS. 3A and 3B show sections of an exemplary embodiment of the stator having two rotors.
Figure 3B:
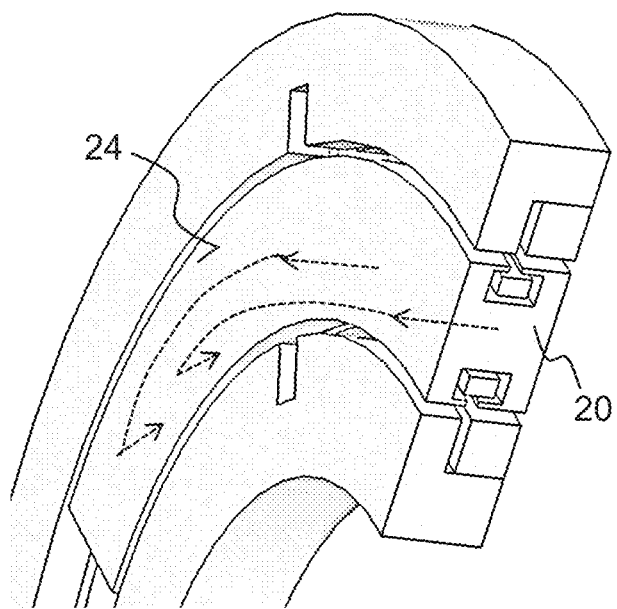

FIGS. 3A and 3B show sections of an exemplary embodiment of the stator 20 having two rotors 32. In FIG. 3A, a view of the first side 23 of the stator 20 and a cross-section through the stator 20 and the two rotors 32 are shown. One of the rotors 32 is arranged inside the stator 20 and the other of the rotors 32 is arranged around the stator 20. That is, one of the rotors 32 is disposed at the inner side 28 of the stator 20 and the other rotor 32 is disposed at the outer side 27 of the stator 20. FIG. 3A shows the magnetic flux in operation of the electric machine 21, in which the stator 20 and the two rotors 32 can be used. A first path of the magnetic flux is shown in the cross-section with the wider dashed lines. Here, the magnetic flux passes in each case through the stator 20 and one of the rotors 32 in radial and axial directions. The radial directions refer to the circle surrounded by the stator 20. The axial direction is parallel to the vertical direction z. A second path of the magnetic flux is shown for the stator 20 and the internally situated rotor 32 with the fine dashed lines. The second path extends from the rotor 32 via the inner side 28 of the stator 20, along the circumference of the stator 20 and via the inner side 28 of the stator 20 back into the rotor 32.

In FIG. 3B, the section shown in FIG. 3A is shown from the second side 24 of the stator 20. The second path of the magnetic flux is illustrated. The latter extends axially, along the circumference of the stator 20 and radially.

Figure 4A:
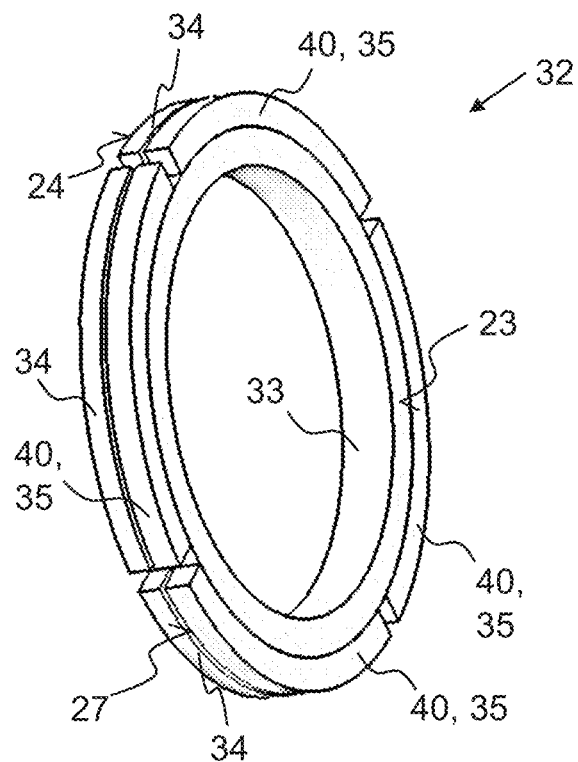
FIGS. 4A, 4B, 4C and 4D show an exemplary embodiment of the rotor.

FIGS. 4A, 4B, 4C and 4D illustrate an exemplary embodiment of the rotor 32 for an electric machine 21. The rotor 32 shown in FIG. 4A includes an annular rotor yoke 33 extending from a first side 23 of the rotor 32 towards a second side 24 of the rotor 32 facing away from the first side 23. Further, the rotor 32 includes four first rotor teeth 34 which are disposed at the second side 24 of the rotor 32, are mechanically connected to the rotor yoke 33 and each extend along a portion of the circumference of the rotor 32. The four first rotor teeth 34 are disposed at an outer side 27 of the rotor yoke 33. The four first rotor teeth 34 each have the same shape, are distributed side by side along the circumference of the rotor yoke 33, and are arranged so as to be spaced from each other. The rotor 32 further has four second rotor teeth 40. The second rotor teeth 40 are arranged at the first side 23 of the rotor 32 and each extend along a portion of the circumference of the rotor 32. The rotor 32 thus has an overall shape of a ring. The second rotor teeth 40 each have the same shape as the teeth 34. In each case, a second rotor tooth 40 extends parallel to a first rotor tooth 34 along the circumference of the rotor 32. The second rotor teeth 40 are also arranged so as to be spaced from one another. The second rotor teeth 40 are attached to the rotor yoke 33. Each of the second rotor teeth 40 includes a permanent magnet 35. In FIG. 4A, the second rotor teeth 40 each consist of a permanent magnet 35.

Figure 4B:
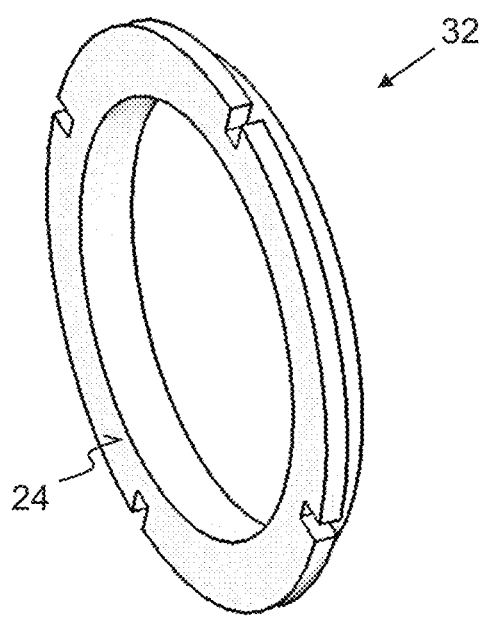

In FIG. 4B, the rotor 32 shown in FIG. 4A is shown without the permanent magnets 35 from the second side 24.

Figure 4C:
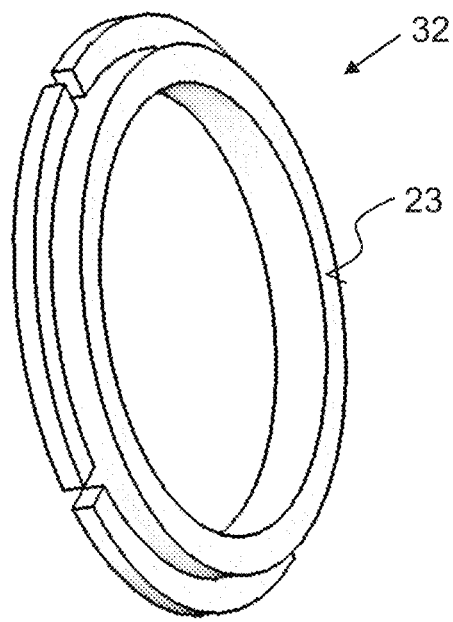

In FIG. 4C, the rotor 32 shown in FIG. 4B is shown from the first side 23.

Figure 4D:
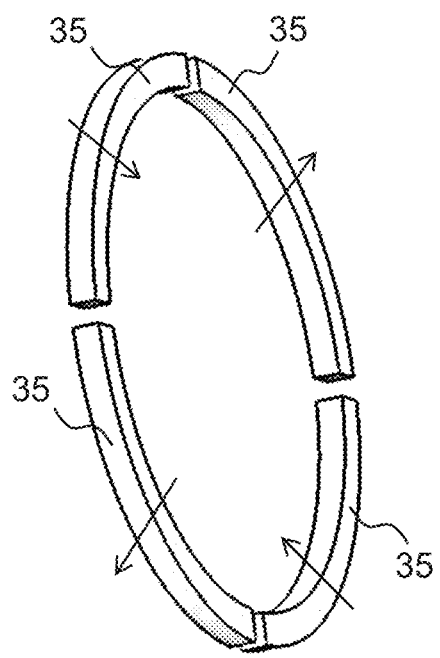

In FIG. 4D, only the permanent magnets 35 of the rotor 32 of FIG. 4A are shown. In addition, the magnetization directions of the permanent magnets 35 are illustrated with arrows. The magnetization direction of two of the permanent magnets 35 runs towards the center of the rotor yoke 33. These two permanent magnets 35 are arranged opposite each other. The magnetization direction of the other two permanent magnets 35 runs away from the center of the rotor yoke 33. These two permanent magnets 35 are also arranged opposite each other.

Figure 5A:
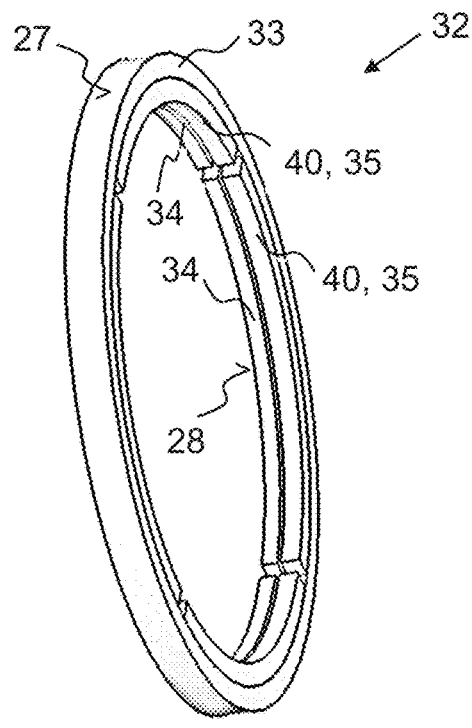
FIGS. 5A, 5B, 5C and 5D show another exemplary embodiment of the rotor.

Referring to FIGS. 5A, 5B, 5C and 5D, another exemplary embodiment of the rotor 32 is illustrated. As shown in FIG. 5A, the difference between this rotor 32 and the rotor 32 shown in FIG. 4A is that the first rotor teeth 34 and the permanent magnets 35 of the second rotor teeth 40 are not arranged at the outer side 27 but at the inner side 28 of the rotor yoke 33.

Figure 5B:
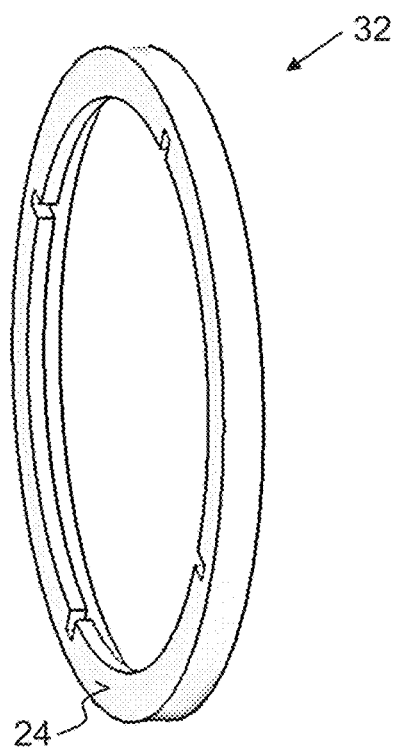

In FIG. 5B, the rotor 32 shown in FIG. 5A is shown without the second rotor teeth 40 from the second side 24.

Figure 5C:
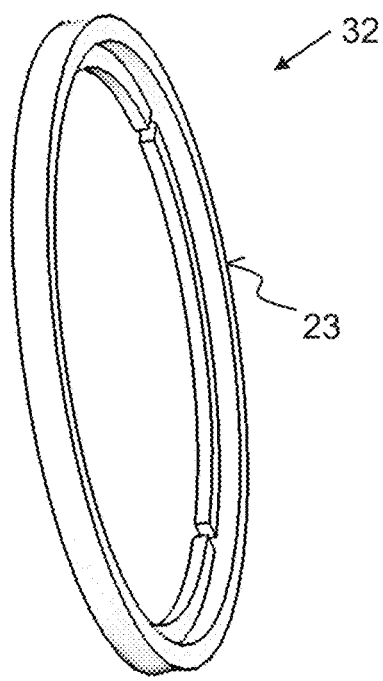

In FIG. 5C, the rotor 32 shown in FIG. 5B is shown from the first side 23.

Figure 5D:
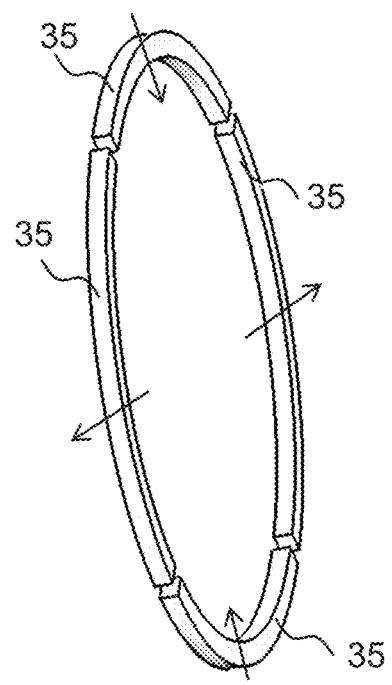

In FIG. 5D, only the permanent magnets 35 of the rotor 32 from FIG. 5A are shown. In addition, the magnetization directions of the permanent magnets 35 are illustrated with arrows. The magnetization directions extend as shown in FIG. 4D.

Figure 6A:
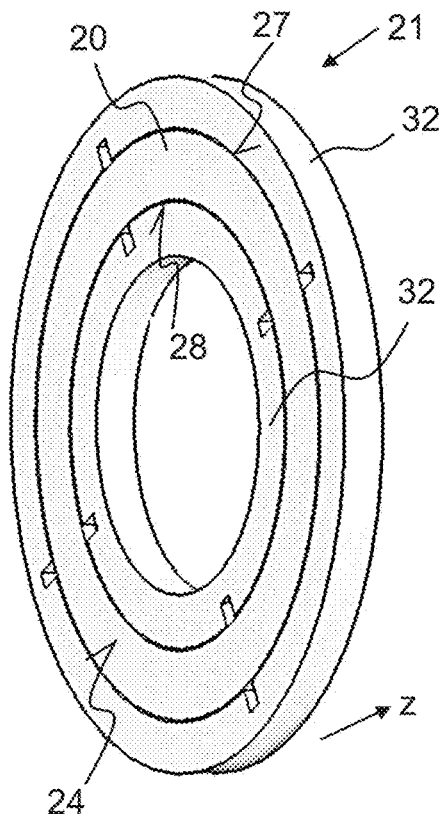
FIGS. 6A and 6B show an exemplary embodiment of the electric machine.
Figure 6B:
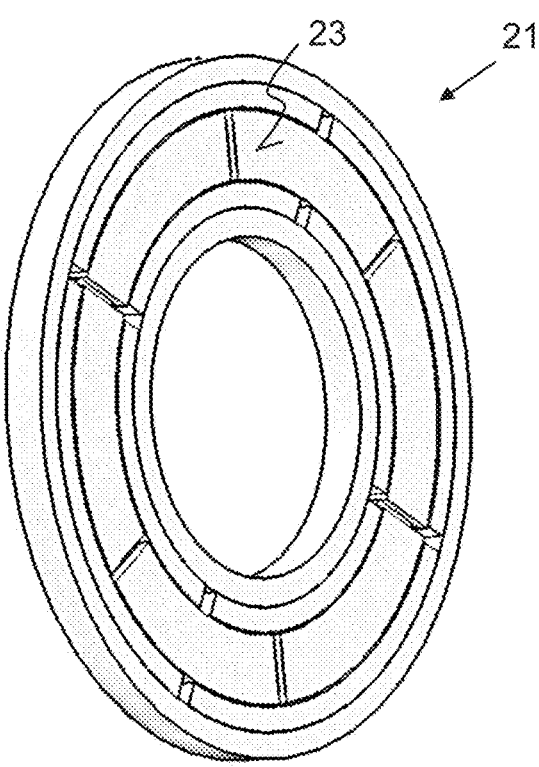

In FIGS. 6A and 6B, an exemplary embodiment of the electric machine 21 is shown. The electric machine 21 comprises the stator 20 shown in FIG. 1A. At the outer side 27 of the stator 20, the rotor 32 shown in FIG. 5A is arranged. At the inner side 28 of the stator 20, the rotor 32 shown in FIG. 4A is arranged. The electric machine 21 is shown from the second side 24. The stator 20 and the two rotors 32 have the same extension along the vertical direction z.

In FIG. 6B, the exemplary embodiment of the electric machine 21 of FIG. 6A is shown from the first side 23.

Figure 7A:
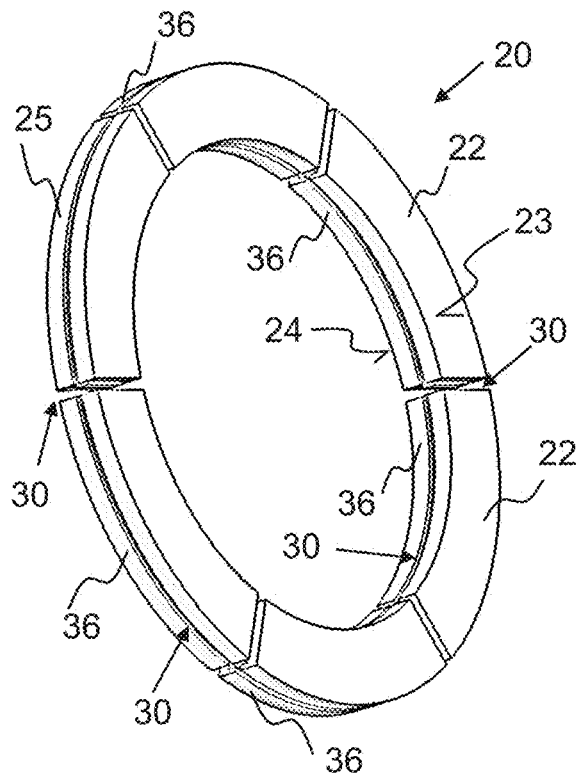
FIGS. 7A and 7B show another exemplary embodiment of the stator.

FIG. 7A shows another exemplary embodiment of the stator 20. Here, the stator 20 is shown from the first side 23. The stator 20 has five additional second plates 36 at the second side 24 of the stator 20. The additional second plates 36 have the same design as the second plate 25. The second plate 25 and the additional second plates 36 extend along a portion of the circumference of the stator 20. The second plate 25 and the additional second plates 36 each have the same shape as the first plates 22. Thus, each tooth 26 is mechanically connected to the second plate 25 or one of the additional second plates 36. The individual components of the stator 20 are held together with a housing, which is not shown.

For an angle α across which each first plate 22, the second plate 25 and each additional second plate 36 extend along the circumference of the stator 20, the following applies:

$$\alpha < \frac{2\pi}{q}$$

Here, α is defined in the circle which is surrounded by the stator 20, and q is the number of first plates 22 of the stator 20. That is, the stator 20 has a total of four sides at which openings 30 are arranged, thus at which a rotor 32 can be arranged for torque generation.

Figure 7B:
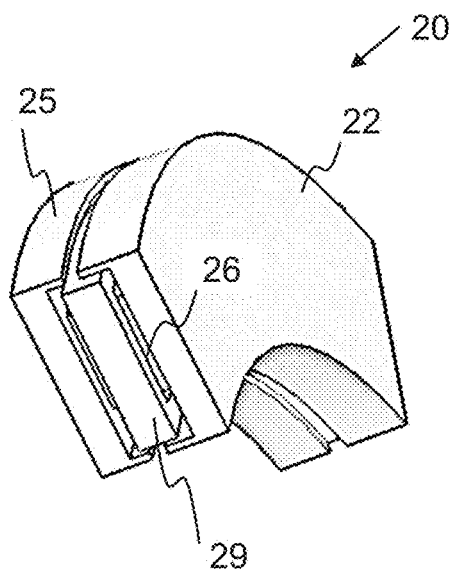

FIG. 7B shows a section of the exemplary embodiment of the stator 20 shown in FIG. 7A. Here, a first plate 22, a second plate 25, a tooth 26 and an electrical conductor 29 are illustrated. The tooth 26 and the electrical conductor 29 are disposed between the first plate 22 and the second plate 25. The electrical conductor 29 is arranged so as to be spaced from the first plate 22 and the second plate 25.

Figure 8A:
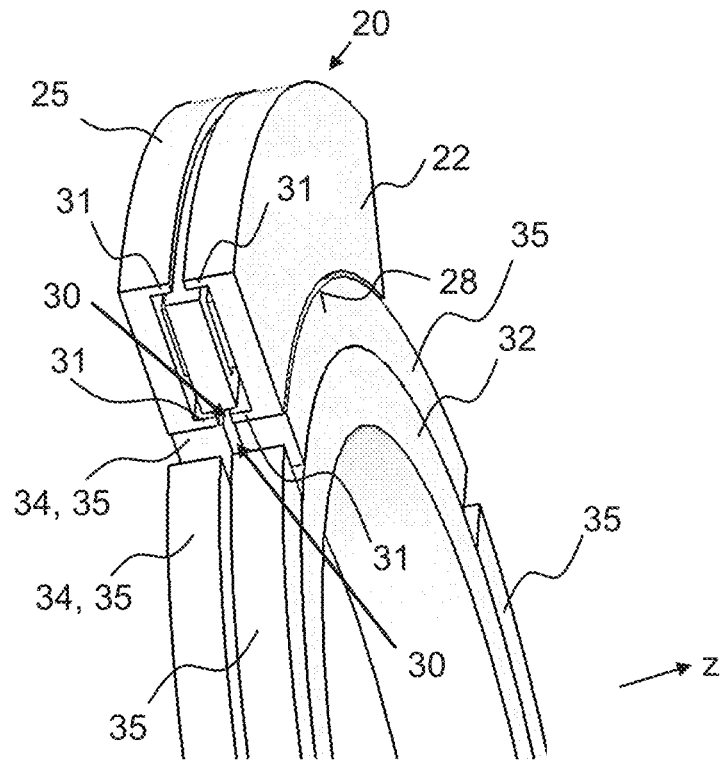
FIGS. 8A, 8B and 8C illustrate another exemplary embodiment of the rotor.
Figure 8B:
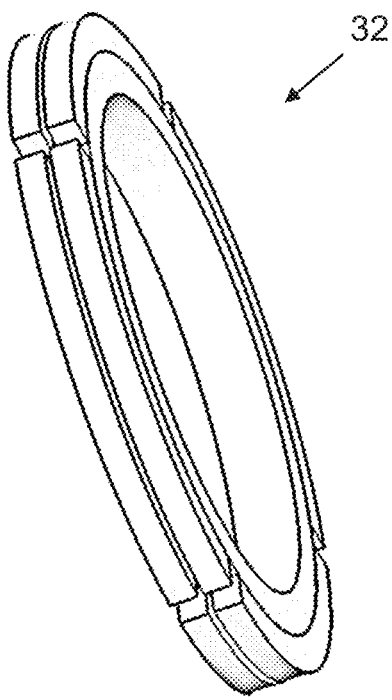
Figure 8C:
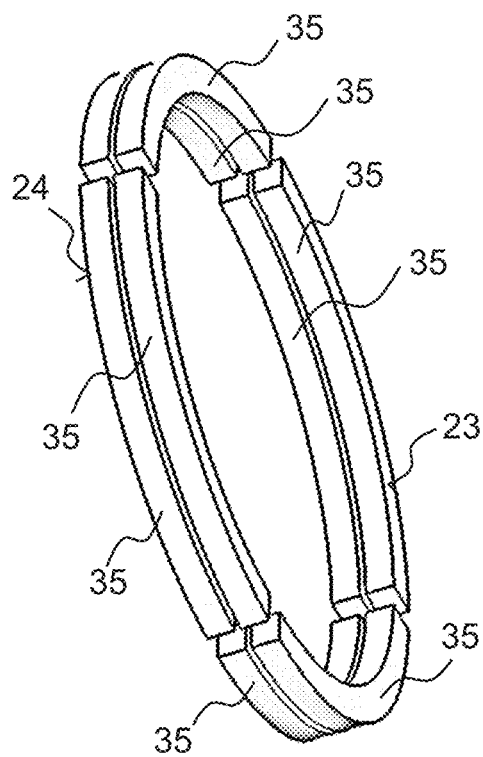

FIGS. 8A, 8B and 8C illustrate another exemplary embodiment of the rotor 32. Here, in FIG. 8A, a portion of the rotor 32 is shown together with a portion of the stator 20. The rotor 32 is arranged at the inner side 28 of the stator 20. The stator 20 has the design shown in FIG. 7A. In contrast to the rotor 32 shown in FIG. 4A, the first rotor teeth 34 of the rotor 32 each have a permanent magnet 35. That is, the first rotor teeth 34 are each formed by a permanent magnet 35. Thus, the rotor 32 has a total of eight permanent magnets 35. In each case, two permanent magnets 35 extend parallel to each other. Along the vertical direction z, the permanent magnets 35 of the rotor 32 each extend as far as one of the projections 31 in each case. Thus, the opening 30 between the first plate 22 and the second plate 25 adjoins the opening 30 between two permanent magnets 35 in each case.

FIG. 8B shows the entire rotor 32 shown in FIG. 8A.

In FIG. 8C, only the permanent magnets 35 of the rotor 32 shown in FIG. 8B are shown. The magnetization directions of the permanent magnets 35 at the first side 23 of the rotor 32 extend as shown in FIG. 5D. At the second side 24 of the rotor 32, the magnetization directions of the permanent magnets 35 run in the opposite direction in each case. This means that in any case the magnetization directions point in opposite directions for two permanent magnets 35 extending parallel to each other.

Figure 9A:
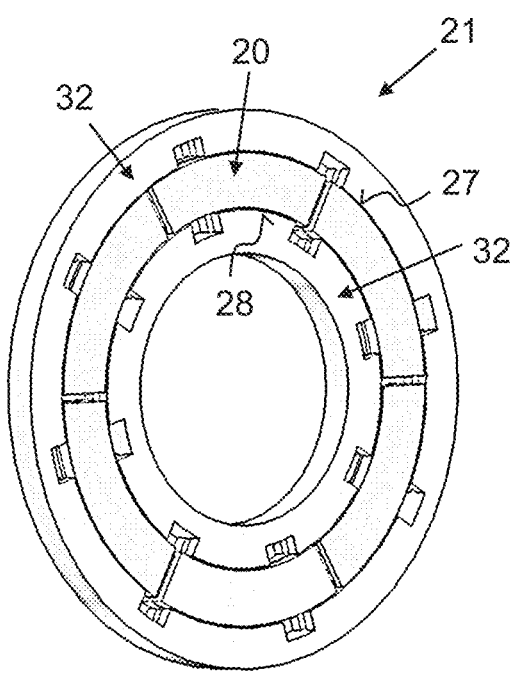
FIGS. 9A, 9B, 9C and 9D illustrate another exemplary embodiment of the electric machine.

With FIGS. 9A, 9B, 9C and 9D, a further exemplary embodiment of the electric machine 21 is illustrated. Here, the entire electric machine 21 is shown in FIG. 9A. A rotor 32 is arranged both at the outer side 27 and at the inner side 28 of the stator 20. The electric machine 21 is a switched reluctance machine.

Figure 9B:
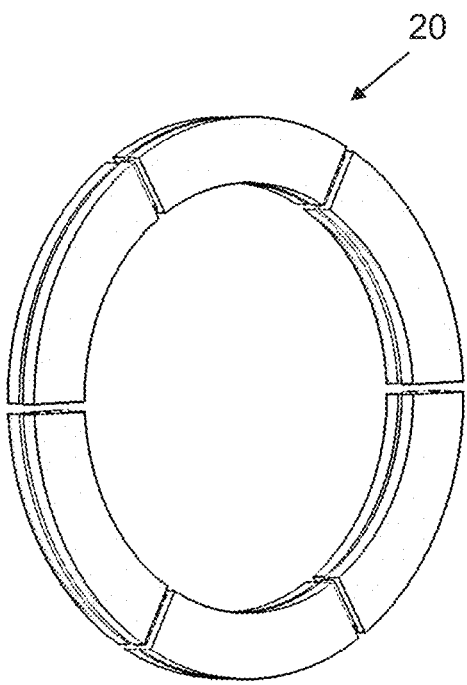

In FIG. 9B, the stator 20 of the electric machine 21 of FIG. 9A is illustrated. The stator 20 has the design shown in FIG. 7A.

Figure 9C:
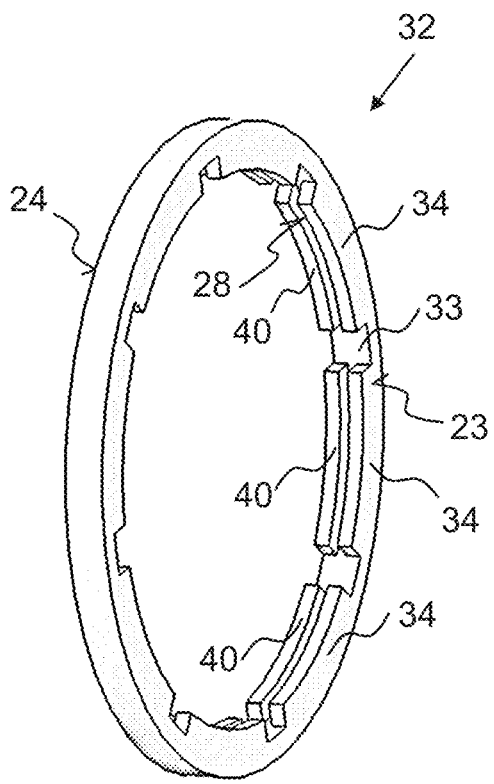

FIG. 9C shows the rotor 32 which is arranged in the electric machine 21 of FIG. 9A at the outer side 27 of the stator 20. The rotor 32 has no permanent magnets. The rotor 32 has an annular rotor yoke 33 to which a total of 16 rotor teeth 34, 40 are attached. Eight first rotor teeth 34 are distributed along the circumference of the rotor yoke 33. Eight second rotor teeth 40 are also distributed along the circumference of the rotor yoke 33 and are each arranged parallel to one of the first rotor teeth 34. In each case, a first rotor tooth 34 and the second rotor tooth 40 running parallel thereto are arranged at a distance from one another. That is, a gap remains between the first rotor teeth 34 and the second rotor teeth 40 in each case. Also along the circumference of the rotor yoke 33, the first rotor teeth 34 and the second rotor teeth 40 are each arranged at a distance from one another. The first rotor teeth 34 are arranged at a first side 23 of the rotor 32, and the second rotor teeth 40 are arranged at a second side 24 of the rotor 32 facing away from the first side 23. The first rotor teeth 34 and the second rotor teeth 40 have the same material and may have the same material as the rotor yoke 33. The first rotor teeth 34 and the second rotor teeth 40 are disposed at the inner side 28 of the rotor yoke 33.

Figure 9D:
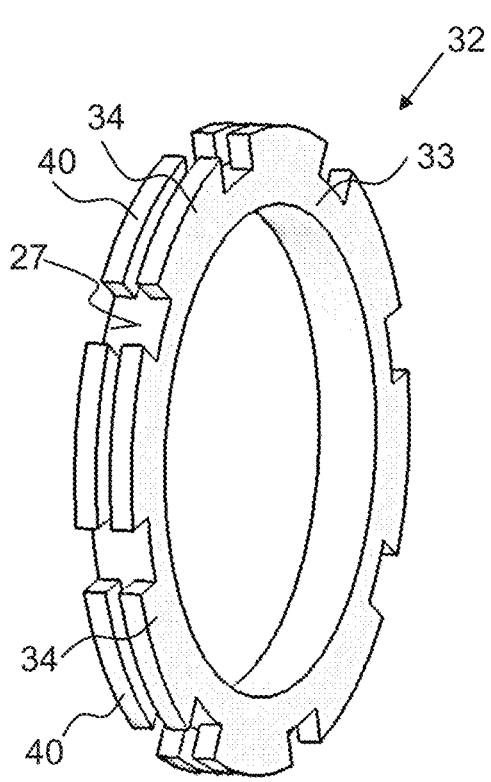

FIG. 9D shows the rotor 32 which is arranged in the electric machine 21 of FIG. 9A at the inner side 28 of the stator 20. The only difference to the rotor 32 shown in FIG. 9C is that the first rotor teeth 34 and the second rotor teeth 40 are arranged at the outer side 27 of the rotor yoke 33.

Referring to FIGS. 10A, 10B, 11A, 11B, 12A and 12B, a further exemplary embodiment of the electric machine 21 is illustrated. The electric machine 21 is a stepper motor.

Figure 10A:
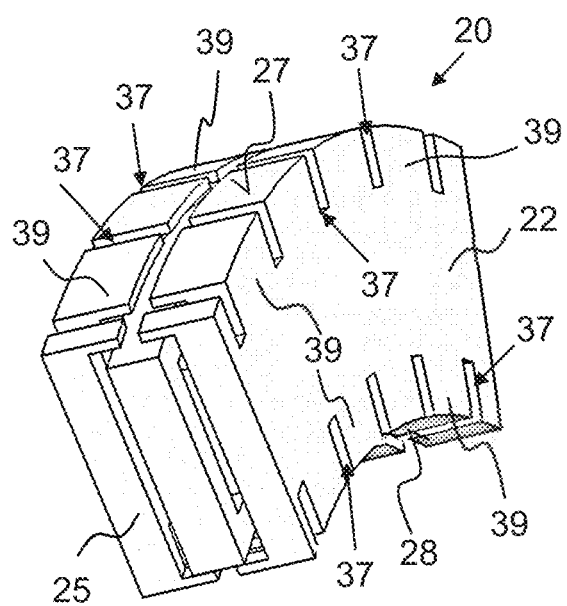
FIGS. 10A, 10B, 11A, 11B, 12A and 12B illustrate another exemplary embodiment of the electric machine.

In FIG. 10A, a section of the stator 20 of the electric machine 21 is shown. The stator 20 has the design shown in FIG. 7A, except that the first plates 22 and the second plate 25 have five recesses 37 at the outer side 27 and at the inner side 28 of the stator 20, respectively. Further teeth 39 are thus formed between the recesses 37.

Figure 10B:
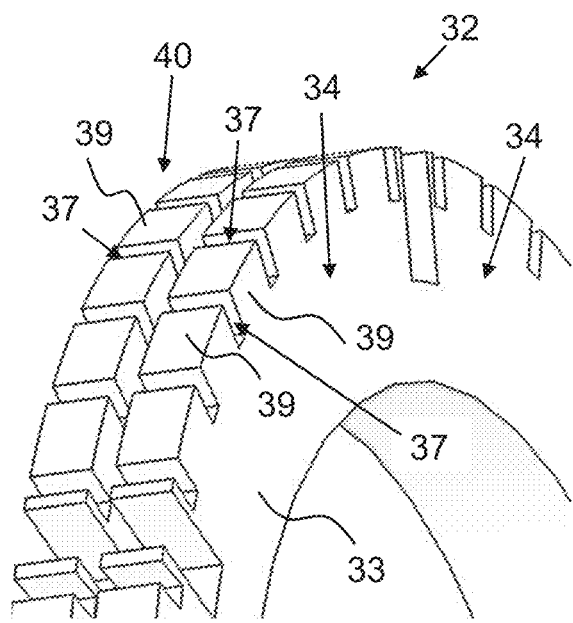

In FIG. 10B, a section of a rotor 32 of the electric machine 21 is shown. The rotor 32 has the design shown in FIG. 9D, but with the difference that the first rotor teeth 34 and the second rotor teeth 40 each have seven recesses 37 at the side facing away from the rotor yoke 33. Additional teeth 39 are thus formed between the recesses 37.

Figure 11A:
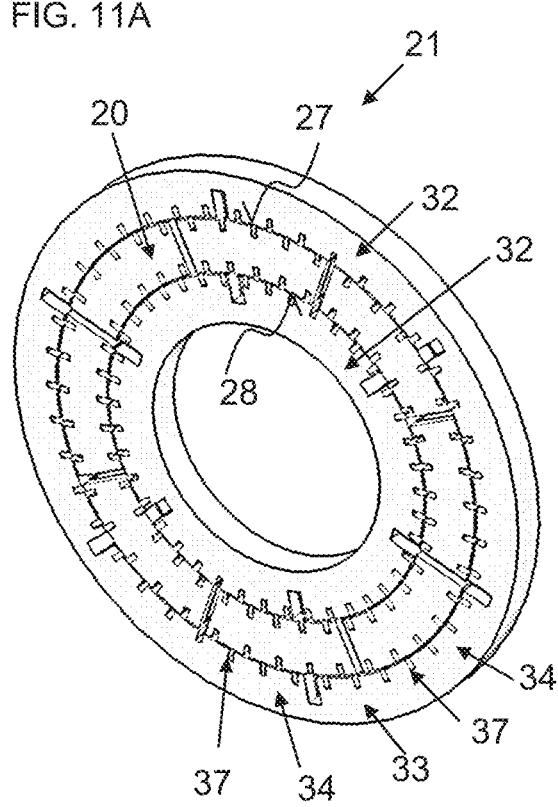

In FIG. 11A, the entire electric machine 21 is shown. It has a stator 20 as shown in FIG. 10A, a rotor 32 as shown in FIG. 10B, and a further rotor 32. The rotor 32 is arranged at the inner side 28 of the stator 20 and the further rotor 32 is arranged at the outer side 27 of the stator 20. The electric machine 21 is a stepper motor. The further rotor 32 has the design shown in FIG. 9C, with the difference that the first rotor teeth 34 and the second rotor teeth 40 each have seven recesses 37 at the side facing away from the rotor yoke 33. A different number of recesses 37 is also possible for all components.

Figure 11B:
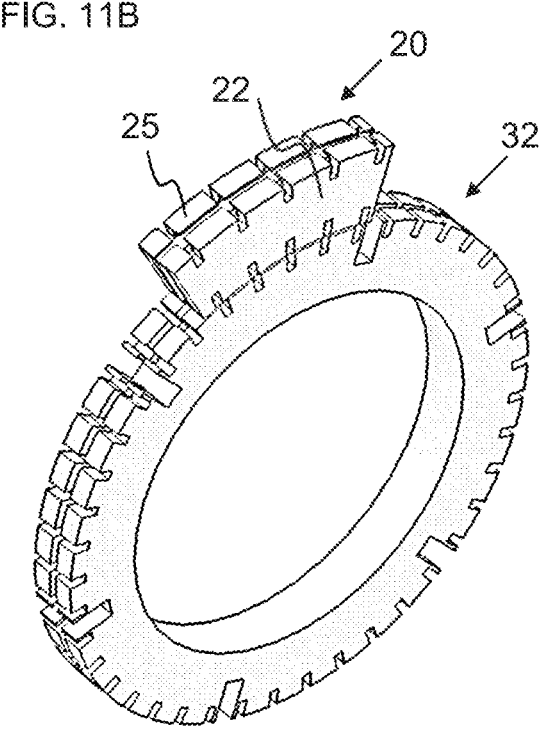

In FIG. 11B, the rotor 32 of FIG. 11A is shown with a part of the stator 20 of FIG. 11A. Regarding the stator 20, a first plate 22 and the second plate 25 are illustrated.

Figure 12A:
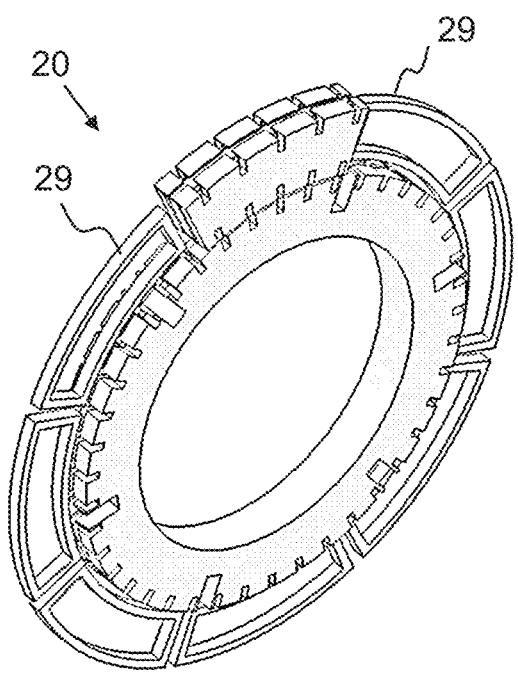

In FIG. 12A, the same view as in FIG. 11B is shown and also all electrical conductors 29 of the stator 20 are illustrated.

Figure 12B:
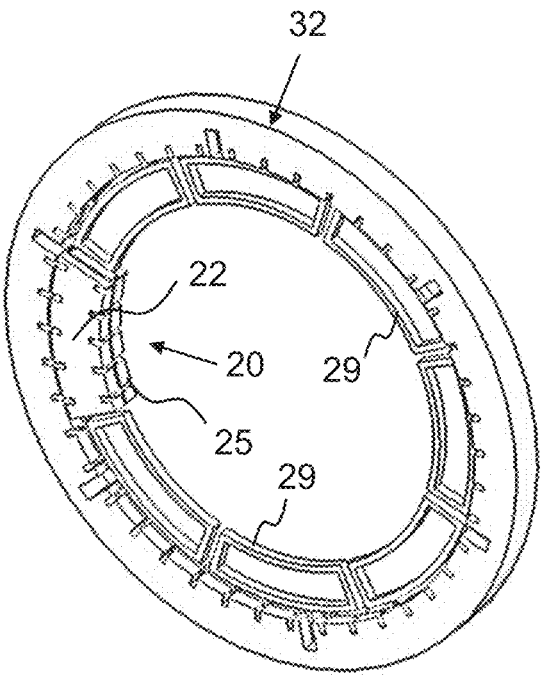

FIG. 12B shows the further rotor 32 of FIG. 11A with a portion of the stator 20 of FIG. 11A. Here, a first plate 22, the second plate 25 and the electrical conductors 29 of the stator 20 are illustrated.

Figure 13:
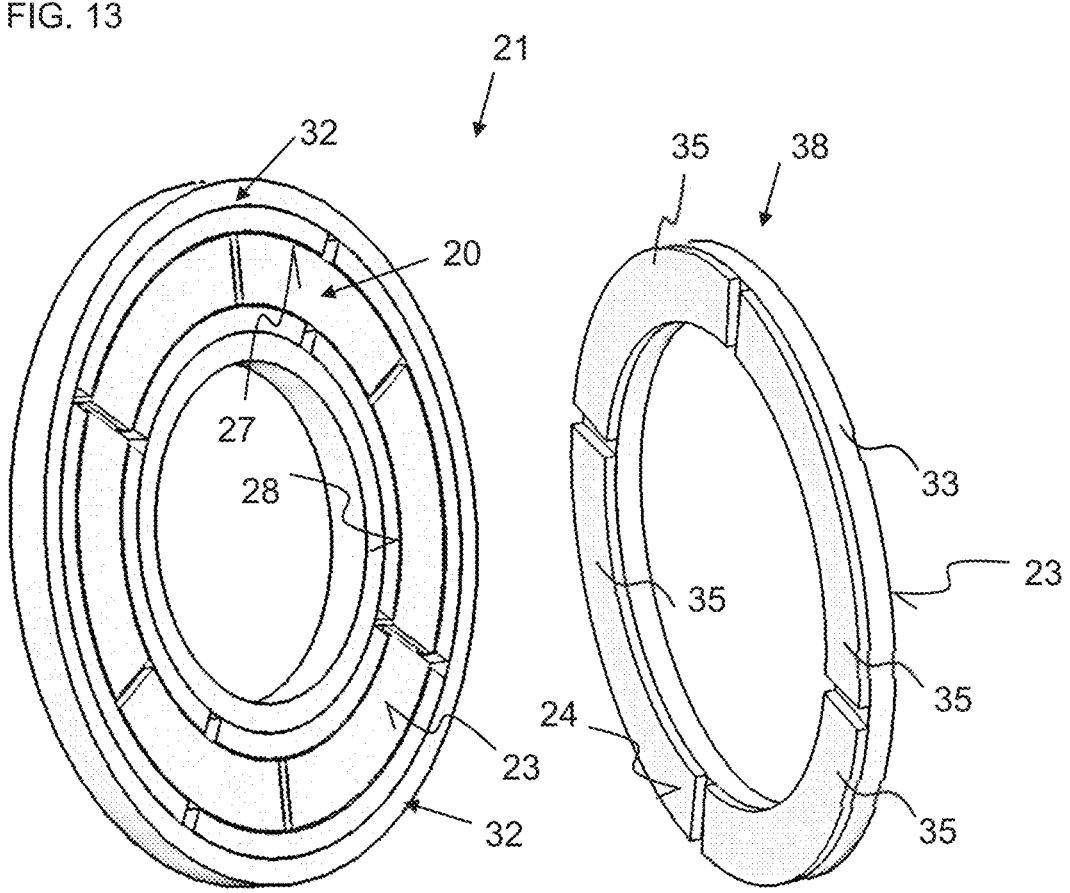
FIGS. 13, 14A, 14B and 14C illustrate another exemplary embodiment of the electric machine.

Referring to FIGS. 13, 14A, 14B and 14C, another exemplary embodiment of the electric machine 21 is shown. In FIG. 13, a stator 20 is shown with a total of three rotors 32, 38. Here, a rotor 32 is arranged at the inner side 28 of the stator 20 and a rotor 32 is arranged at the outer side 27 of the stator 20. The electric machine 21 further comprises an axial flux rotor 38 arranged at the first side 23 of the stator 20. The axial flux rotor 38 is shown in FIG. 13 separately from the other components. The axial flux rotor 38 has a rotor yoke 33 to which four permanent magnets 35 are attached. The permanent magnets 35 are arranged so as to be spaced from each other along the circumference of the rotor yoke 33. The permanent magnets 35 are arranged at a second side 24 of the axial flux rotor 38, and the rotor yoke 33 is arranged at a first side 23 of the axial flux rotor 38 facing away from the second side 24. The second side 24 of the axial flux rotor 38 faces the first side 23 of the stator 20. The stator 20 has the design shown in FIG. 1A or the design shown in FIG. 7A. The rotor 32 which is arranged at the inner side 28 of the stator 20, has the design shown in FIG. 4A, and the rotor 32 which is arranged at the outer side 27 of the stator 20, has the design shown in FIG. 5A.

Figure 14A:
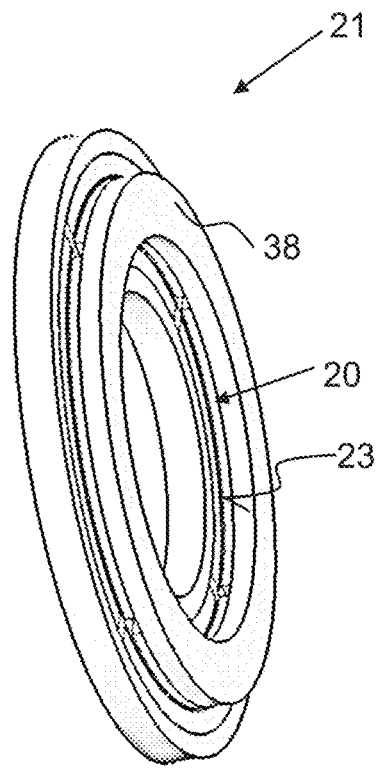

FIG. 14A shows the electric machine 21 of FIG. 13 in the assembled state. That is, the axial flux rotor 38 is arranged at the first side 23 of the stator 20.

Figure 14B:
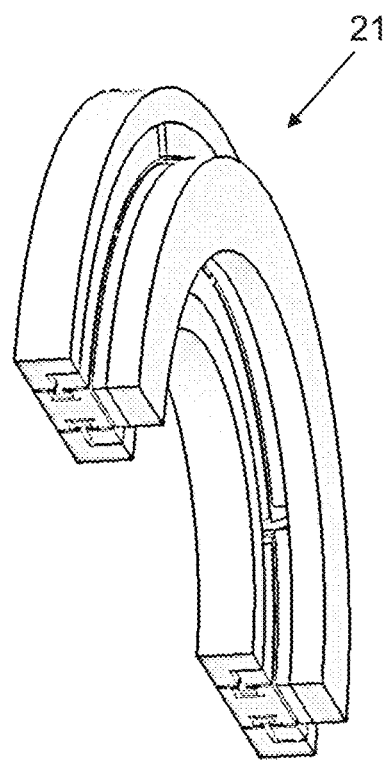

In FIG. 14B, a part of the electric machine 21 from FIG. 14A is shown. Here, a cross-section through the electric machine 21 is shown at two positions along the circumference of the electric machine 21.

Figure 14C:
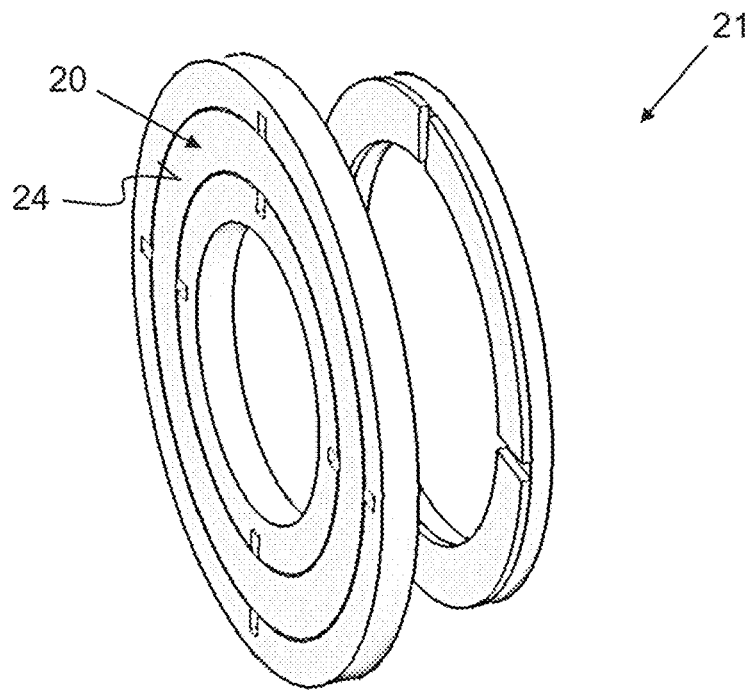

In FIG. 14C, the design of the electric machine 21 shown in FIG. 13 is shown from the second side 24 of the stator 20.

This patent application claims priority from German patent application 10 2021 116 518.0, the disclosure content of which is hereby included by reference.

The invention claimed is:
1. A stator for an electric machine, the stator comprising:
at least three first plates at a first side of the stator,
at least three teeth, each tooth being mechanically connected to a respective one of the first plates, and
at least one second plate at a second side of the stator facing away from the first side, wherein
the stator has, at least in some places, the shape of a ring having an outer side and an inner side,
an electrical conductor is assigned to each tooth, and
for each tooth, the respective electrical conductor is arranged at least at one side of the tooth which points towards the outer side of the stator and at one side of the tooth which points towards the inner side of the stator.

2. The stator according to claim 1, wherein the first plates each have a projection starting from the first side of the stator, which projection is arranged at the outer side of the stator or the first plates each have a projection starting from the first side of the stator, which projection is arranged at the inner side of the stator.

3. The stator according to claim 1, wherein the teeth and the first plates each extend along a part of the circumference of the stator.

4. The stator according to claim 1, wherein the stator comprises at least two additional second plates at the second side and each tooth is mechanically connected to the second plate or one of the additional second plates.

5. The stator according to claim 1, wherein the second plate extends further along the circumference of the stator than each of the first plates.

6. The stator according to claim 1, wherein the electrical conductors each form a coil.

7. The stator according to claim 1, wherein the first plates are arranged so as to be spaced from the second plate at the outer side and the inner side of the stator.

8. The stator according to claim 1, wherein the first plates are each arranged so as to be spaced apart from each other along the circumference of the stator.

9. The stator according to claim 1, wherein the first plates and the second plate each comprise at least two recesses at the outer side and the inner side of the stator.

10. An electric machine having a stator according to claim 1 and a rotor, wherein the rotor is arranged at the outer side or at the inner side of the stator.

11. The electric machine according to claim 10, wherein the rotor is a rotor according to claim 1.

12. The electric machine according to claim 10, wherein the electric machine comprises a further rotor according to claim 1, which is arranged at the outer side or at the inner side of the stator.

13. The electric machine according to claim 10, wherein the electric machine comprises an axial flux rotor arranged at the first side of the stator.

14. A rotor for an electric machine, the rotor comprising:
an annular rotor yoke extending from a first side of the rotor to a second side of the rotor facing away from the first side,
at least two first rotor teeth which are arranged at the second side of the rotor, are mechanically connected to the rotor yoke and each extend along a part of the circumference of the rotor, and
at least two second rotor teeth, wherein
the second rotor teeth are arranged at the first side of the rotor,
the second rotor teeth each extend along a part of the circumference of the rotor, and
the second rotor teeth each comprise a permanent magnet or the second rotor teeth each comprise the same material as the first rotor teeth.

15. The rotor according to claim 14, wherein the first rotor teeth and the second rotor teeth are arranged at an inner side of the annular rotor yoke.

16. The rotor according to claim 14, wherein the magnetization direction of at least one of the permanent magnets extends towards the center of the annular rotor yoke and the magnetization direction of at least one other permanent magnet extends away from the center of the annular rotor yoke.

* * * * *